March 9, 1937. W. J. WEBER 2,073,037
FASTENER
Filed May 15, 1934
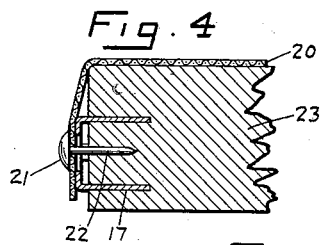
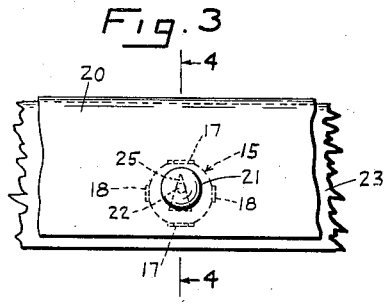
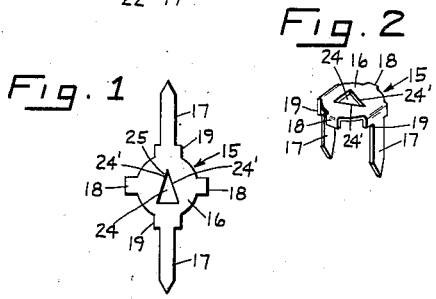
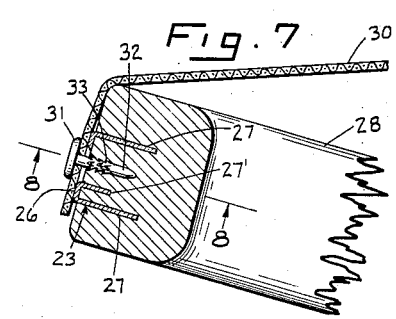
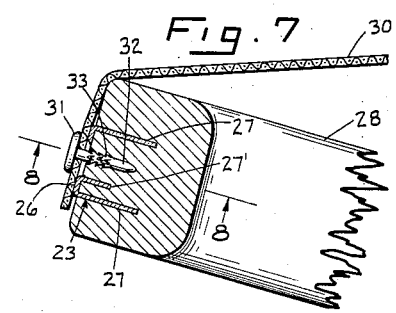
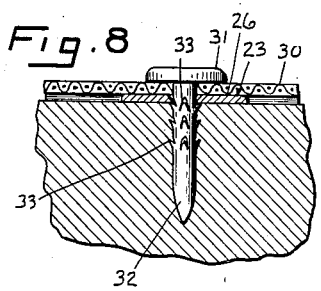
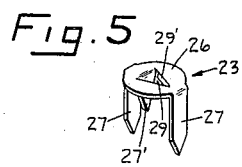
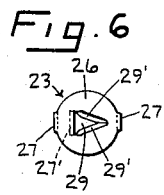
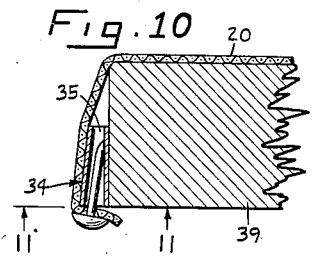
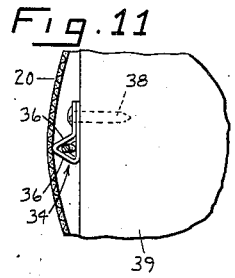
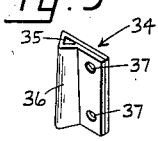
INVENTOR.
WILLIAM J. WEBER.
BY William J. Feyrer
ATTORNEY Patented Mar. 9, 1937

2,073,037

UNITED STATES PATENT OFFICE 2,073,037

FASTENER

William J. Weber, South Norwalk, Conn.

Application May 15, 1934, Serial No. 725,725

16 Claims. (Cl. 85—11)

This invention relates to improved fasteners, and particularly to fasteners for use generally with ironing boards, automobile tops, tables, and divers other places.

In ironing boards, and the covering materials thereon, which are subject to extreme moisture and dryness the consequent swelling and shrinking cause the holes for nail shanks to enlarge and allow the nails to drop out, for example when a person rubs against them, or allows the material shrinkage of the covering material to pull the nails from the supports. Similarly the pull and whipping of an automobile top caused by wind pressure tends to pull the fastening nails from the supports. There are many other similar problems in divers other fields which make it desirable to have a fastener capable of holding under all conditions.

It is an object of the present invention to provide a means to hold regular nails in supports despite natural changes in the support and despite pull of the covering materials.

It is another object to provide a fastener which will be simple to manufacture and use, and which will be inexpensive.

One feature of the present invention is the provision of spacers on a base member which causes the head thereof to be spaced from the support, to facilitate locating it after a cover or material is stretched over it.

Another feature is the provision of tapering apertures in which the shank of the nail is wedged to prevent it from being pulled out of a support.

Another feature is the provision of a fastener in which a regular nail may be used, which nail however need not be driven into the main support, thereby facilitating changing the cover.

Another feature is the provision of a structure adapted to lock the shank of nails in their regular support.

Other features and advantages will appear hereinafter and others will be apparent.

In the drawing, which shows the present preferred embodiments of the invention, but which are not restrictive:

Figure 1 is a view of the preformed blank from which the base member is made.

Fig. 2 is a perspective view of the formed base member.

Fig. 3 is a fragmentary view of a table top and cover with the preferred form of connector in cover holding position.

Fig. 4 is a sectional view taken on line 4—4 of Fig. 3.

Fig. 5 is a perspective view, similar to Fig. 2 of a modified form of base member.

Fig. 6 is a top view of the base member shown in Fig. 5.

Fig. 7 is a sectional view through the center of the modified form of fastener.

Fig. 8 is a sectional view taken on line 8—8 of Fig. 7.

Fig. 9 is a perspective view of another modified form of the present invention.

Fig. 10 is a sectional view through the center of the fastener shown in Fig. 9, but complete and in place on a table.

Fig. 11 is a view taken on line 11—11 of Fig. 10.

In detail, the present preferred form of this invention, shown in Figs. 1 through 4, comprises a base member 15, preferably blanked as shown in Fig. 1 with a head 16 having integral legs 17 adapted to be struck down as shown in Fig. 2 in order to, in effect, make the base member similar to a staple for connection or attachment to a support 23 as shown, to a table or ironing board, or to any other desired object.

Spacers 18 in the form of separate short legs and 19 in the form of shoulders on the long legs, although not absolutely essential, are provided and struck down to space the head 16 from the object to which the base member is applied in order to facilitate feeling or locating it when a material 20, for example a table or ironing board cover which is to be held by the fastener, is pulled over it.

A complementary fastener member, hereinafter referred to as a top member 21 which may for economy be a regular ornamental head upholstery nail as shown, or any other standard form of small nail or brad is also provided which is used in almost the usual way by passing a shank 22 thereof through the material 20 and then driving it into the support 23. However, it should be particularly noted that the present invention provides a novel structure for holding the top member 21 in the support once it is properly located therein.

To this end the present invention provides a tapering aperture 24 in the head 16 of the base member 15 of sufficient size to easily permit the shank 22 to be passed therethrough to the support 23 and with the apex 25' thereof extending toward the top of the support as shown in Fig. 3 in such manner that the tapering side walls 24' thereof grip the shank 22 and prevent it from being withdrawn from the support 23 by shrinkage and pull of the material 20 or swelling and shrinkage of the support 23 tending to pull the material and tending to loosen the shank 22 in the support 23.

The spacers 18 and 19 which locate and maintain the head 16 spaced from the support 23, facilitate adding the top member 21 thereto and assist in locating the tapering aperture 24 therein so that the shank 22 may be passed to the support properly.

In Figs. 6 through 8 there is shown a modified form of the present invention having the common characteristic of wedging and holding a material holding part, but having a simpler form of base member 25 with a head 26' and two main legs 27 and a supplement auxiliary leg 27' all adapted to be driven into a support 28 which as shown in Fig. 7 is a cross member for an auto top but which may be a table top, ironing board, or any other form of support.

As with the preferred form of the invention, the head is provided with a tapering aperture 29, but having beveled walls 29', best seen in Fig. 6, which have the characteristic of both wedging and bighting the shank 22 of the top member 21 if the latter is used. In the use illustrated in Fig. 7, viz on the support for the top of an automobile where there is a strong pull or strain on a material 30 forming the top on the auto, or would be occasioned by natural wind of high velocity, or by driving at high speed, it is preferable to provide a special form of top member 31 having a shank 32 provided with barbs 33 adapted to engage with or hook into the beveled walls 29' and thereby be locked or positively held in the support by the base member 25. This special form of top member 31 may be used advantageously with the base member 15 of the first form of the invention if desired.

Assembly, as with the first form of the invention, is accomplished by merely securing the base member 25 to any desired support by driving the legs 27 into place. The supplementary leg 27' lanced down when blanking the tapering aperture 29 assists in making a strong connection to the support. The beveled walls 29' cut into and hold the shank of the top member more and more with increased pull of the top material.

In Figs. 9 through 11 there is shown a second modified form of the present invention still retaining the main characteristic of wedging and thereby retaining the material holding member in operative position.

This form of the invention comprises a base member 34 preferably in the form of a long strap folded upon itself and formed with a long channel 35 having tapering side walls 36 and provided with holes 37 through which screws or brads 38 may be passed to secure it to a support 39.

After the base member 34 is secured to the support 39, it is merely necessary to stretch a material 20 over the support and over the bottom end of the base member 34 whereupon the top member 21 or 31 may be passed through the material and into the channel 35 so that the natural pull of the material wedges the shank thereof between the tapering walls 36 to lock it in position therein.

The base members 15 and 25 need not be provided with integral legs, for it is possible to connect just the head portions 16 or 26 respectively thereof with separate nails similarly to the nails 38 shown in Figs. 9 through 11, by inserting these heads in suitable recesses in the support, or by various other types of connection.

Other modifications may be made within the scope of this invention and portions of the improvements may be used without others.

I claim:

1. A fastener, for holding materials on supports, comprising a base member directly securable to the outside of the support and having an aperture with tapering side walls; a top member forming a direct work support; and a shank on the top member cooperating with the tapering side walls of the base member to hold the material on the support.

2. A fastener, for holding materials on supports, comprising a base member securable to the support and having a tapering aperture; and a top member adapted to pierce the material and have a wedging connection with the base member to hold the material on the support.

3. A fastener, for holding materials on supports, comprising a base member securable to the support and having an aperture with tapering side walls; a top member; a shank on the top member adapted to pierce and hold the material relative to the base member and support; and barbs on the shank cooperating with the tapering side walls of the aperture to hold the top member relative to the base member.

4. A fastener, for holding materials on supports, comprising a base member provided with a tapering aperture and secured to the support; and a top member having a connection with the base member tapering aperture and support, adapted to hold material on the support, and adapted to be held in the base member and support increasingly proportionate to the increased pull of the material.

5. A fastener, for holding materials on supports, comprising a base member having an elongated slot; integral legs on the base member for securing it to the support; and a top member passed through the material, elongated slot, and into the support, and held in the support by said base member, and held therein increasingly proportionate to the increased pull of the material.

6. A fastener, for holding materials on supports, comprising a base member having an aperture, and adapted to be secured to the support; tapering walls defining said aperture; and a top member having a shank adapted to be passed through the material, said shank cooperating with the tapering walls of the aperture in the base member to hold the top member in the support.

7. A fastener, for holding materials on supports, comprising a base member securable to the support; a head on the base member onto which the materials are passed to be secured; a top member having a connection with the base member and support, adapted to hold material on the support; and means on the base member adapted to hold the head in spaced relation to the support thereby to facilitate connecting the top member to the support after materials are passed onto the head.

8. A fastener, for holding materials on supports, comprising a base member securable to the support; a head on the base member onto which the materials are passed to be secured; a top member having a connection with the base member and support, adapted to hold material on the support; and lugs on the base member adapted to locate and support the head of the base member in spaced relation to the main support thereby to facilitate connecting the top member to the support after materials are passed onto the head.

9. A fastener, for holding materials on supports, comprising a base member securable to the support and having an aperture; a head on the base member onto which the materials are passed to be secured; tapering walls defining said aperture; a top member; a shank on said top member adapted to be passed into the material and the support, and having a wedge connection with the walls of the aperture; and means adapted to hold the head of the base member in spaced relation to the support thereby to facilitate aligning the shank with the aperture in the base member.

10. A fastener, for holding materials on supports, comprising a base member directly securable to the outside of the support and having a tapering aperture; tapering walls defining said aperture; and a top member having a shank for connection with the material and with the base member, said shank being capable of wedging with and being held by the tapering walls of the aperture in the base member.

11. A fastener, for holding materials on supports comprising a base member directly securable to the outside of the support and having a tapering aperture; beveled tapering walls defining said tapering aperture; and a top member having a shank for connection with the support to hold material on the support, adapted to cut into and held in the support by the beveled walls.

12. A fastener, for holding material on supports, comprising a base member securable to the outer face of the support; beveled walls forming a tapering aperture in the base member; a top member; and a barbed shank on the top member adapted to be non-rotatably passed through the material, tapering aperture, and into the support, said barbed shank cooperating with the beveled walls of the base member to be locked in the support.

13. A fastener for holding material on supports, comprising a base member securable to the outer face of the support and having a tapering aperture; tapering walls defining said aperture; a top member; and a barbed shank on the top member adapted to be non-rotatably passed through the material, and tapering aperture, said barbed shank cooperating with the walls of the tapering aperture to hold the top member in the base member.

14. A fastener, for holding material on supports, comprising a base member securable to the support; a nail for directly securing material to the support; and wedging means on the base member adapted to squeeze and hold the nail in the support.

15. A fastener, for holding materials on supports, comprising a base member securable to the support; a nail; a shank on the nail adapted to pass through the material to be held thereby; a long channel on the base member adapted to receive the nail; and tapering walls in said channel adapted to alone wedge the nail and hold it in the channel.

16. A fastener, for holding material on supports, comprising a base member securable to the support; a nail adapted to pass through and pull the material; and a V shaped channel on the base member adapted to alone receive, wedge, and hold the material pulling nail.

WILLIAM J. WEBER.